United States Patent
Sigal et al.

(10) Patent No.: US 6,703,059 B2
(45) Date of Patent: Mar. 9, 2004

(54) PROCESS FOR PRODUCING BURGUNDY-COLORED FLAVORED OLIVES AND PRODUCT MADE THEREBY

(75) Inventors: Abdulkadir Yussuf Sigal, Tracy, CA (US); Samson Te Hsia, Fremont, CA (US); Benjamin James Hall, Tracy, CA (US); Debra Dianne Abram, Pleasanton, CA (US); Julia Ann Scearce, Foster City, CA (US)

(73) Assignee: Musco Olive Products, Inc., Tracy, CA (US)

( * ) Notice: Subject to any disclaimer, the term of this patent is extended or adjusted under 35 U.S.C. 154(b) by 98 days.

(21) Appl. No.: 10/127,016

(22) Filed: Apr. 19, 2002

(65) Prior Publication Data

US 2003/0198717 A1 Oct. 23, 2003

(51) Int. Cl.[7] ............. A23L 1/275; A23L 1/212
(52) U.S. Cl. ............. 426/250; 426/268; 426/270; 426/615
(58) Field of Search ............. 426/250, 270, 426/268, 615

(56) References Cited

U.S. PATENT DOCUMENTS

| | | | | |
|---|---|---|---|---|
| 3,630,226 A | * | 12/1971 | Develter | 137/575 |
| 4,463,023 A | * | 7/1984 | McCorkle et al. | 426/270 |
| 4,664,926 A | * | 5/1987 | Scrimshire | 426/270 |
| 5,151,286 A | * | 9/1992 | Adams et al. | 426/324 |
| 5,620,726 A | * | 4/1997 | Casamassima | 426/254 |

* cited by examiner

*Primary Examiner*—N. Bhat
(74) *Attorney, Agent, or Firm*—Dorsey & Whitney; Robert B. Chickering

(57) ABSTRACT

A process for producing burgundy colored olives including the steps of darkening the color of the olives (21); neutralizing the pH of the olives (23); while neutralized, soaking of the olives in an aqueous solution of Red Dye No. 3 at ambient temperatures for at least 12 hours (25); and packing the olives in an acidic brine solution for storage (27). In another aspect, the process includes flavoring the packing solution with a mother brine recovered from an olive fermentation process (29).

40 Claims, 3 Drawing Sheets

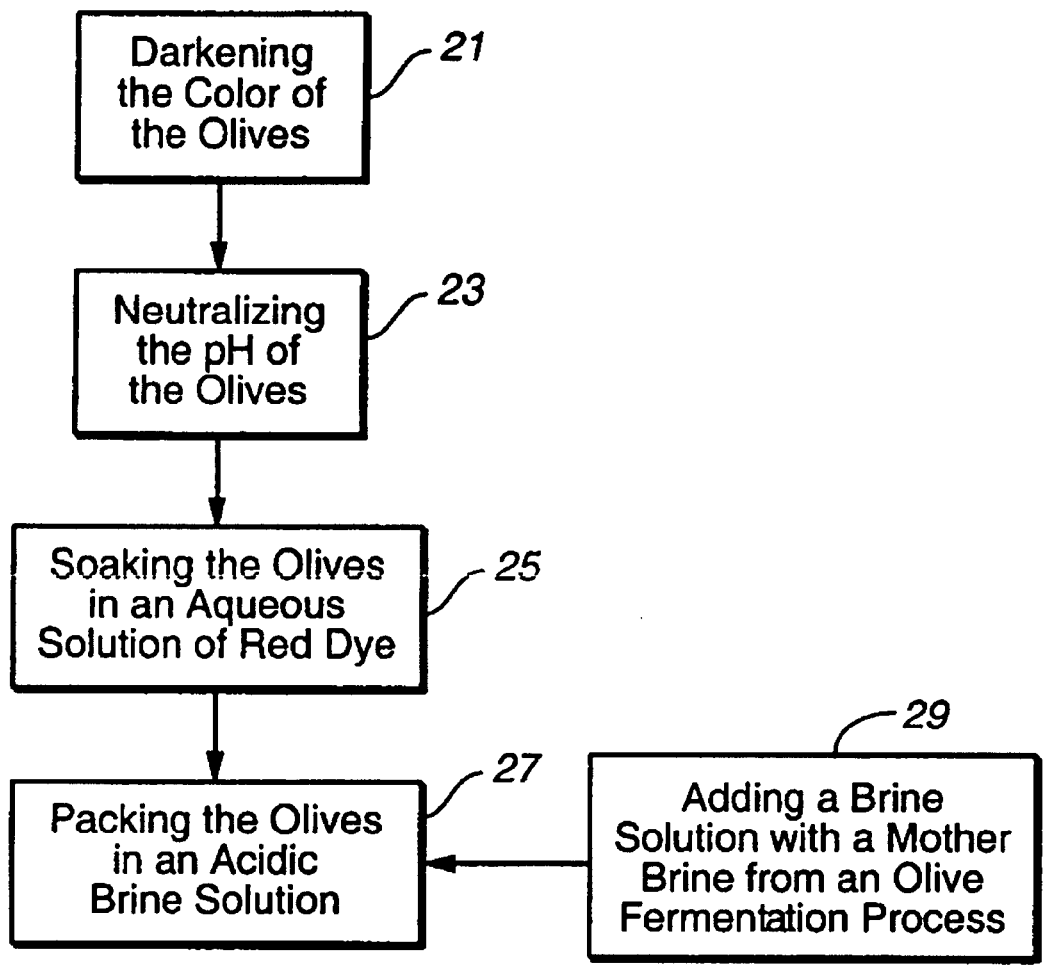
FIG._1

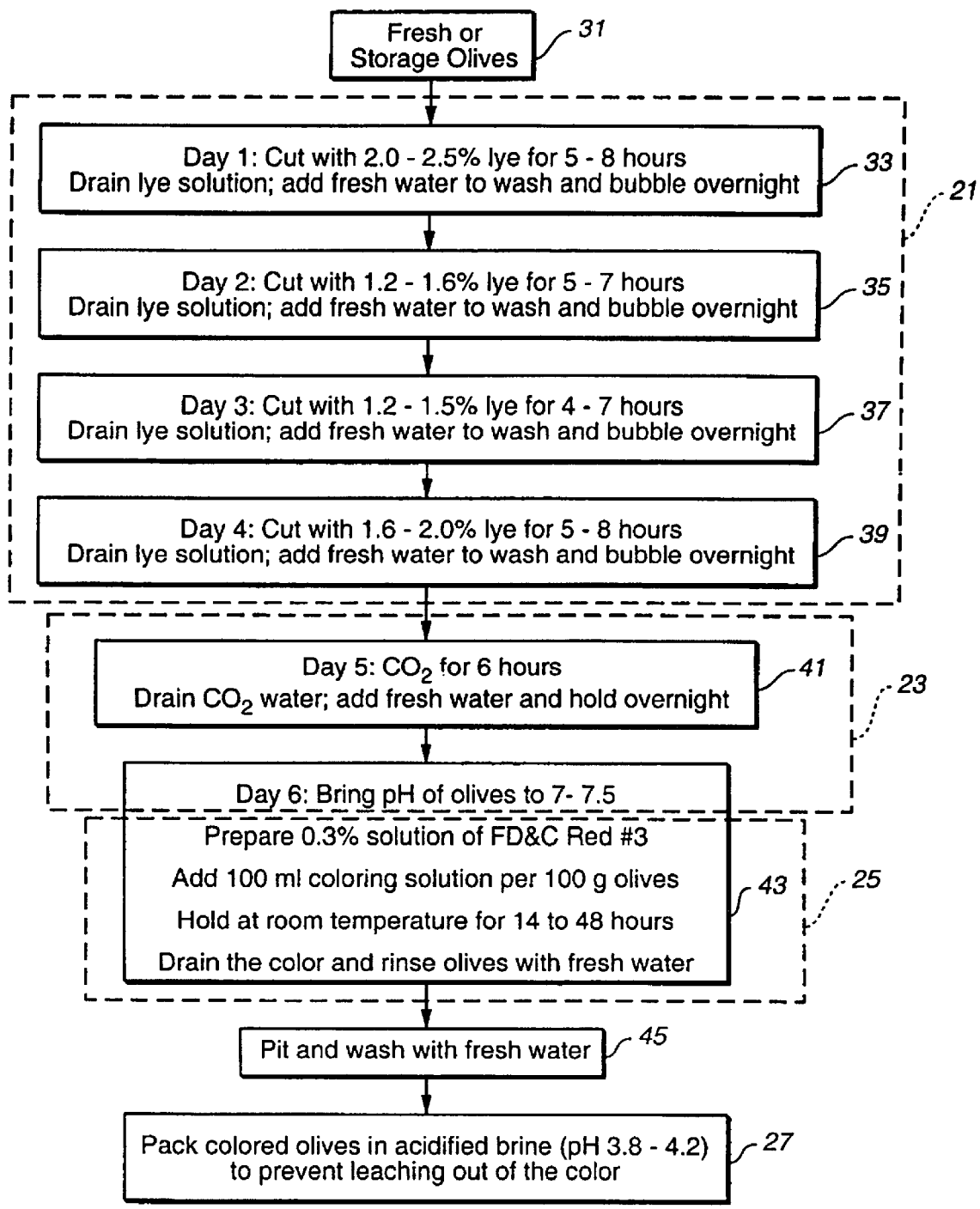
FIG._2

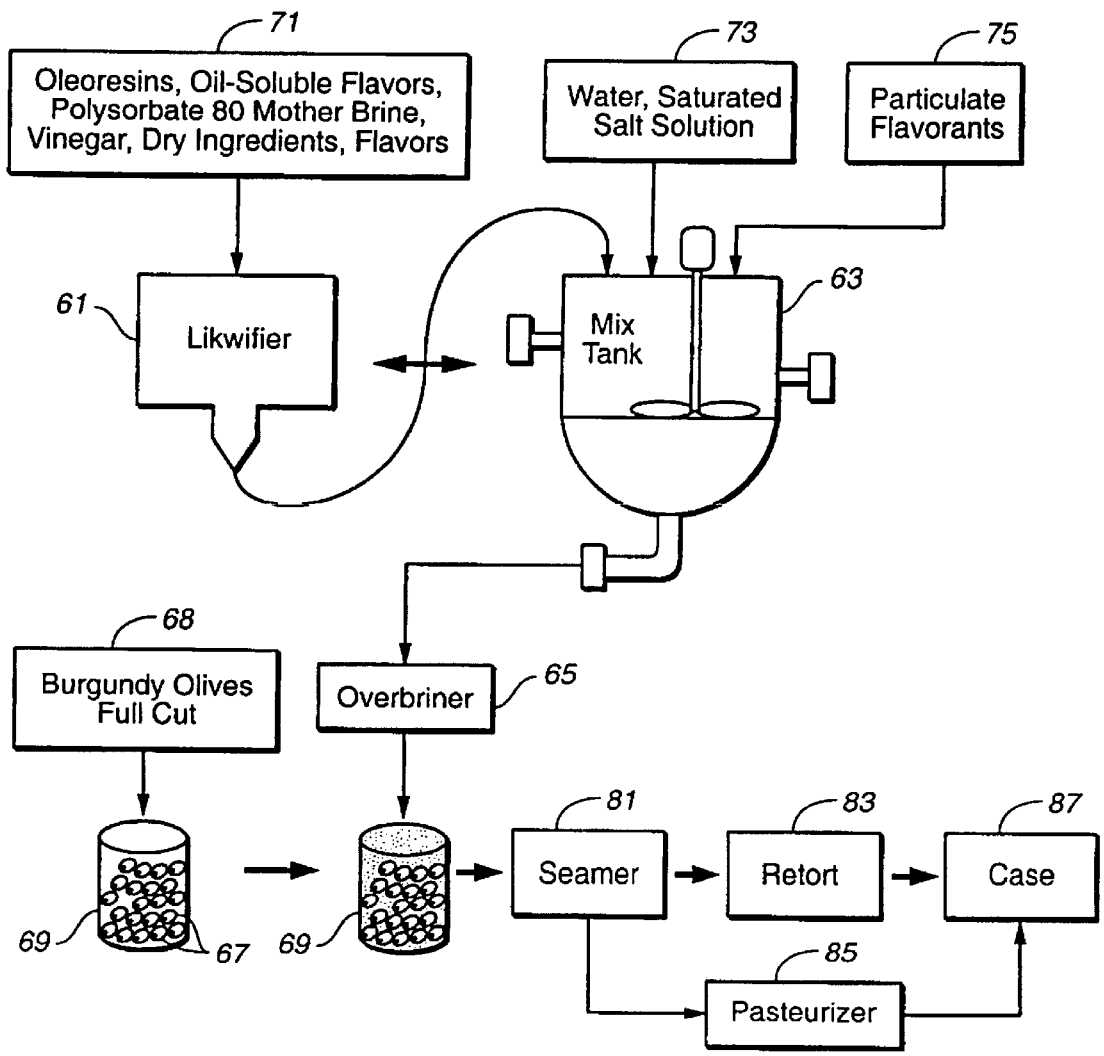
FIG._3

PROCESS FOR PRODUCING BURGUNDY-COLORED FLAVORED OLIVES AND PRODUCT MADE THEREBY

TECHNICAL FIELD

The present invention relates, in general, to the coloring and flavoring of food products, and more particularly, relates to the coloring and flavoring of olives.

BACKGROUND ART

There are a wide range of commercially available olive products, but the market clearly is dominated by green olives and black olives. In the European market, green olives tend to be commercially more successful than black olives. Green olives tend to be more bitter or astringent and have more complex flavoring. In the United States market, black olives dominate the market and their flavor is less intense and bitter.

In recent years, the popularity of Kalamata olives has increased substantially. These olives are burgundy in color and tend to be somewhere between green olives and black olives in the complexity of their flavor and bitterness. The production of Kalamata olives, and other varieties which have approximately the same appearance and flavor tends to be very time-consuming and expensive. Often, such olives are produced by a fermentation process in a brine solution which requires months before the desired appearance and flavor is achieved. Classic Kalamata olives are, however, often more astringent than much of the U.S. market appreciates. Thus, the flavor of Kalamata olives can be too intense for many United States consumers, who are more used to black olive products.

Attempts have been made to both color and flavor food products in general and olives in particular. The patent literature, for example, includes patents on fermenting cucumbers and brine to pickle the cucumbers, as, for example, is set forth in U.S. Pat. No. 3,403,032. Flavoring of olive stuffing, such as pimento, is disclosed in U.S. Pat. Nos. 2,382,682 and 2,436,463.

In connection with olives, the patent art includes processes such as are set forth in U.S. Pat. Nos. 5,171,586 and 5,094,871 for de-bittering or cutting olive pulp to produce a black ripe olive product or a Spanish-type olive product.

Various methods for producing black olives using caustic solutions to cut the bitterness of the green olives also are well known in the art and are typified by U.S. Pat. Nos. 4,463,023 and 4,664,926. An alternative method of producing black olives is set forth in U.S. Pat. No. 5,837,304.

Coloring of green olives using erythrosine or Red Dye No. 3 is also known in the prior art. In U.S. Pat. No. 5,620,726, green olives are bleached using either a sulfurous anhydride, alkaline sulfite or citric acid solution and then the bleached olives are immersed in a boiling aqueous erythrosine solution to produce an olive having a tomato-red or strawberry red color.

Flavoring of olives is disclosed in U.S. Pat. Nos. 1,852, 941, 3,480,448 and 3,975,270. In the first of these patents flavor is imparted by packing them in a brine having a flavoring edible oil. In the second patent, U.S. Pat. No. 3,480,448 a brine-curing process is employed in which the olives are fermented in a brine solution. Such fermentation is widely used in the industry in connection with Spanish, Sicilian and Kalamata olives. Finally, in U.S. Pat. No. 3,975,270, the reconstitution of waste brine solution from an olive processing system is taught so that the olive-processing liquor can be recycled for subsequent fermentation cycles.

While these prior art processes are capable of both coloring and flavoring olives, the coloring and flavoring effects are often not particularly commercially desirable, or require complex and expensive equipment, or require an undesirably long processing time.

Accordingly, it is an object of the process and product of the present invention to produce a burgundy colored olive which also has complex fermentation-based flavors and to achieve this result using a process which takes days, instead of months, to complete.

Another object of the present invention is to provide a process for producing burgundy colored olives in which the colorant is stable and remains substantially fixed in the flesh of the olive for long periods of time.

Another object of the present invention is to produce a burgundy colored olive in which the flavoring of the olive can be tailored to the tastes of various consumers, ranging from a near-black olive flavor to a complex, very spicy Kalamata/Sicilian/Spanish olive fermentation flavor.

A further object of the present invention is to provide a process and product for forming flavored burgundy colored olives which can be implemented at a relatively low cost using conventional olive processing apparatus.

The olive coloring and flavoring processes of the present invention, and resulting olives, have other objects and features of advantage which will become apparent from, or are set forth in more detail in, the accompanying drawing and the following description of the Best Mode Of Carrying Out The Invention.

DISCLOSURE OF INVENTION

In one aspect of the present invention, a process for producing burgundy colored olives is provided and includes the steps, briefly, of darkening the color of the green olives, preferably using a caustic de-bittering or cutting solution and exposing them to air to darken them. Thereafter the process includes the steps of, substantially neutralizing the pH of the olives, while neutralized, soaking the olives in an aqueous solution of a food grade red dye, such as, Red Dye No. 3, at ambient temperatures for a period of at least 12 hours, and packing the olives in an acidic solution to fix the colorant in the olive flesh during storage. The packing solution is preferably acidic brine solution which includes a mother brine recovered as a by-product of an olive fermentation process.

In the other aspect of the present invention a process for producing complexly flavored olives is provided which comprises, briefly, the steps of processing the olives for packing, and thereafter, packing the olives in a container in a brine solution including a mother brine from an olive fermentation process present in an amount ranging between about 1 to about 20 percent by weight. Most preferably, the mother brine also has a salt level less than about 30 degrees, as measured by a Salometer, and the process includes the step of adding a saturated salt solution to the mother brine solution in an amount between about 6 to about 20 percent by volume. The flavoring process also includes the step of adding emulsifying agent to the brine solution in an amount effective to suspend flavorants in the brine solution and to prevent separation thereof.

BRIEF DESCRIPTION OF THE DRAWING

FIG. 1 is a flow diagram of the olive coloring and flavoring process of the present invention.

FIG. 2 is a more detailed flow diagram of the coloring steps of the process of FIG. 1.

FIG. 3 is a more detailed flow diagram of the flavoring steps of process of FIG. 1.

BEST MODE OF CARRYING OUT THE INVENTION

The olive coloring and flavoring process of the present invention allows the producer to tailor the flavor and color of the olives so as to create a new category of commercial olives, namely, flavored burgundy olives.

Referring to FIG. 1, the steps of the coloring process of the present invention can be described. Unlike processes such as are set forth in U.S. Pat. No. 5,620,726, the process of the present invention does not involve bleaching the olives, in fact, the first step of the process of the present invention is diametrically opposed to bleaching, namely, step 21 of FIG. 1, which is the step of darkening the color of the olives. As will be described in more detail in connection with FIG. 2, the darkened step is preferably accomplished using caustic soda and rinses, with exposure of the olives to air so as to darken or blacken them, rather than bleach them near-white.

Once the natural or green olives have been darkened to an almost black color, the present process includes the step of substantially neutralizing the pH of the olives. Since the olives are preferably darkened using a caustic solution in which the pH rises to well above 7, neutralizing step 23 can be accomplished by introducing $CO_2$, or an acid, into the solution which contains the olives, most typically a water solution after the darkening process has been completed. The pH of the olives is preferably reduced to between about 7.0 and about 8.0 during the neutralization step.

The olives are then immersed in a solution containing a food grade red dye, such as Red Dye No. 3, and allowed to soak, at step 25, in the aqueous solution food grade red dye at ambient temperatures for a period of at least 12 hours, and most preferably between 14 and 48 hours. Red Dye No. 3, or erythrosine, has been found to be very effective in coloring the darkened olives to a burgundy color. The length of time which the olives are soaked in Red Dye No. 3 in step 25 can be varied so as to produce burgundy olives of differing shades. The final different burgundy shades can be determined by measuring how deep the color solution penetrates during soaking time, more penetration will produce relatively red burgundy olives, where as less penetration will produce relatively brown burgundy color. The time is takes for the color solution to penetrate the olives depends on many other factors such as texture of the olives, size of the olives and temperature. Since the rate at which the color solution penetrates the olives varies, an operator is needed to check the color penetration at certain time intervals.

A final step in the broad statement of the process of the present invention is shown as a packing step 27 in FIG. 1. During the packing step, the colored olives are packed in an acidic brine solution. Most preferably the acidic brine solution is formed using an organic acid solution of the type commonly employed for such foods as wine vinegar and rice vinegar.

It has been found that by packing the olives for storage or commercial distribution in an acidic brine solution the colorant absorbed during soaking step 25, which produces the burgundy color, will remain substantially fixed in the flesh of the olives. Thus, the colorant or Red Dye No. 3 does not leach back out into an acidic packing brine over time when the olives are stored in a solution. The pH of the acidic brine solution is preferably below 3.3 (the brine plus the olives will have a pH below 4.2), which will be set forth in more detail below. In another aspect of the present invention the packing brine preferably is flavored by a mother brine solution which is a by-product of an olive fermentation process, as shown in step 29.

Referring now to FIG. 2, further details of the olive coloring process of the present invention can be described.

The olives used in the process of the present invention can be any one of a number of a different varieties of olives, with common commercially available varieties including Manzanilla, Sevillano or Ascalano olives. One of the advantages of the process of the present invention is that it can be used on olives which have been stored for quite some period of time after harvesting. This allows production of burgundy colored and complexly flavored olives to occur at times other than at the height of the olive harvesting season.

Kalamata, Sicilian and Spanish olives typically have to be placed in brine and a fermentation process started almost immediately after harvesting, whereas the burgundy olives of the present invention can be stored in a 1–2% acidic acid solution with 0.2% sodium benzoate for months before the process of the present invention is undertaken.

As shown in FIG. 2, therefore, olives can be taken from storage at step 31 and then processed using the steps of the present invention. Obviously, freshly harvested olives can also be used at step 31. In FIG. 2 darkening step 21 has been broken down into 4 days of processing at steps 33, 35, 37 and 39. The darkening steps shown in FIG. 2 are not regarded as having novelty per se. They are essentially the same steps which are used in olive de-bittering or cutting processes in which green olives are de-bittered and blackened using a caustic soda solution, such as a lye solution, in a manner well known in the industry. The concentrations of lye and the times set forth in FIG. 2 are not regarded as being critical, but instead are only typical or representative of concentrations and times which will produce sufficient darkening to enable subsequent coloring with erythrosine colorant to produce the desired burgundy color.

At step 33, the green olives which have been brought from storage, or freshly harvested, at step 31 are placed in a caustic soda or lye solution having a volume percentage of about 2.0 to about 2.5 percent by volume of lye. Most preferably, in step 33 a 2.1 percent lye solution is applied to the olives until the lye cuts an average surface area of about 10 percent and 50 percent of the olives has some kind of lye penetration. This will typically take between 5 and 8 hours, after which the lye solution is drained and fresh water is placed on the olives. Air is then injected into the tanks containing the olives and fresh water using a timer system so that, for example, there is 5 minutes of air bubbling every 20 minutes of soaking in the water. The periodic bubbling of air through the water and olives occurs for approximately 12 hours, for example, overnight, and in addition to darkening the olives, periodic air bubbling prevents the lye from burning the olives. The olives can be exposed to more or less air bubbling, but as the exposure to air increases, the olives darken more before they are fully cut or de-bittered.

On the second day, namely step 35, the tanks are drained and a 1.2 to about 1.5 percent lye solution is applied to the olives. The solution is allowed to stay on the olives until the lye cuts an average surface area of about 50 percent and about 90 percent of the olives have some kind of lye penetration. This will typically take between about 5 to about 7 hours. When the desired degree of penetration has been achieved, the lye solution is removed and fresh water is again applied to the olives. Air is bubbled through the fresh water and olives for about 12 hours or overnight.

On the third day step 37 is comprised of applying about a 1.2 to about 1.5 percent lye solution to the olives, and most preferably, a 1.45 percent lye solution. The olives should remain in the lye solution until 90 percent of the olives get a complete circle lye cut around the outer edge of the olives. One hundred percent of the olives have some kind of lye penetration and 50 percent of the olives have been cut all the way to the pit in about 4 to about 7 hours. Again, the lye solution is drained, fresh water added and periodic bubbling of air through the water and olives is applied to darken the olives.

In step 39, on the fourth day of processing, a final lye solution of between about 1.6 to about 2.0 percent is applied to the olives and allowed to remain on the fruit until 100 percent penetration has been achieved. This normally will be accomplished in about 5 to about 8 hours, after which the lye solution is drained and fresh water added. Periodic bubbling of air through the solution and olives again occurs overnight.

Steps 33, 35, 37 and 39 describe typical steps in the production of black olives from fresh green olives, and these steps are broadly known in the industry. The result is olives which are relatively dark, but not quite as black as conventional black olives.

The next step in the present process is to neutralize the pH of the olives. This can be accomplished by adding concentrated $CO_2$ to the water to produce carbonic acid, or adding another acid into the water and olives in the processing tanks, which starts the neutralization of the lye in the fruits. When the pH has dropped to between about 7.5 and 8.0, which usually requires between about 1 to about 4 hours, with 2 hours being typical, the water with $CO_2$ or acid is drained from the olives and then replaced with fresh water to bring the pH of the fruits down to between 7.0 and 8.0. Alternatively, the lye can be rinsed from the olives with water, and most preferably after $CO_2$ is used, the olives can sit in fresh water overnight. The pH of the olives should be brought down to between about 7 and about 8.0. Step 23 in FIGS. 1 and 2, therefore, is a combination of the day 5 step 41 in FIG. 2 and a portion of step 43 on day 6.

On the sixth day, step 33 can include the addition of more $CO_2$ to bring the pH to between 7.0 and 8.0, but once that has been achieved, the olives are then placed in fresh water for a red coloring step which brings the darkened olives to a burgundy color. At step 43 a color solution of Red Dye No. 3 is created in warm water (140° F.–200° F.) with about 17 grams of color per 100 milliliters of water. The warm concentrated color solution is added to ambient water to produce a solution of about 0.3 percent of Red Dye No. 3 in the solution. One hundred grams of olives per 100 milliliters of coloring solution should be present in the tank, and the immersed olives are soaked in step 25 in this coloring solution at room or ambient temperature for at least 12 and preferably 14–48 hours. At day 7 or 8, the color solution is drained from the tank and the olives are rinsed in fresh water in order to wash off the unfixed colorant.

At step 45, the olives may be pitted and washed again before packing. It is not required that the olives be pitted, but for many consumers, pitted olives are regarded as being preferable. It also is possible to pit the olives prior to coloring, but they then will be colored from the inside toward the outside as well as the reverse, which gives a somewhat unusual uniform color or appearance to the olives.

The final step in the process is shown at 27 on FIGS. 1 and 2 and is comprised of placing the colored olives in an acidified brine. The olives may be simply stored in an acidified brine or packed in the acidified brine. The acidified brine preserves the burgundy color which has been developed in the olives as the result of soaking step 25. Most preferably, the acidified brine solution has a pH in the range of about 2.3 to about 3.3 and the olives are packed in containers. The finished product (olive plus brine) has a pH in the range of about 3.6 to about 4.2, with about 3.8 to about 4.0 being optimum. Using an acidic brine solution prevents leaching of color out of the flesh of the fruits into the packing brine over time.

As will be seen from FIG. 1, the present process most preferably also includes a flavoring step 29 in which the brine solution imparts a flavor to the burgundy olives. In the broadest aspect of the coloring process of the present invention, however, flavoring of the burgundy olives is not required. The resulting product from the steps as shown in FIG. 2 will be an olive product having a flavor similar to conventional black olives, only having a burgundy color. Depending on the preferences of the consumers, such relatively unflavored olives can be quite commercially successful.

Turning now to FIG. 3, the process for flavoring olives with a complex fermentation-based flavor can be described in more detail.

In a second aspect of the process of the present invention, a method for producing complexly flavored olives is provided. It is well known that the olives which are treated with a fermentation process, including months of soaking in brine, result in an end product which can include very complex flavor components and nuances produced by fermentation. Unfortunately, however, the fermentation process is a slow one and has attendant cost disadvantages.

In the flavoring process of the present invention, the olives are first processed as they normally would be for packing. Thus, if flavored burgundy olives are produced, they are processed by darkening, neutralizing and soaking in an aqueous solution of Red Dye No. 3, as described above. If black olives are produced, they are merely cut or treated to reduce the bitterness. In the present flavoring process, however, the sophisticated and complex flavor nuances present in fermented olives are achieved by a packing step 29 (FIG. 1) in which the olives are packed in a container having a brine solution which also includes a mother brine constituent from an olive fermentation process. The mother brine should be present in an amount of about 1 to about 20 percent by weight of the packing solution. The mother brine can be recovered from an olive fermentation process as a by-product of that process. Usually, the brine which results from olive fermentation is merely disposed of, or possibly reconstituted for re-use, but in the present invention, it is used as a flavoring component in a packing brine.

The mother brine can be obtained from various fermentation processes but one example would be as follows. Sevillano olives, which are widely grown in the United States, are put in storage tanks for fermentation. The starting brine for fermentation may be about 0.1 percent lactic acid, 0.1 percent acetic acid, 18–22 degrees Salometer (18–22 percent of saturation). The brine is checked weekly for 12 weeks, and then monthly for 4–12 months. The salt is brought up in ½ degree increments to 26 degrees while the brine is being circulated. The salt content should never be below 17 degrees Salometer. The pH in the fermentation tank will typically be below 3.85, and if it should rise about that level, acid is added to the tank. Fermentation takes 4–12 months and the finished product in the mother brine will have a Salometer of 27–30, with a target of 28 Salometer. The acid will be 0.7–1.1 percent, with a target of 0.95 percent as lactic acid. Brine pH will be 3.89 or less and the target is 3.65.

When the desired fermentation is completed, for example, 4–12 months, the olives are packed as Sicilian style olives. The mother brine in which fermentation occurred is used in the present invention as a component of a packing brine for the flavored olives.

In the most preferred form of the flavoring process of the present invention, a cutting step is employed in which the bitterness of the olives is cut or reduced, preferably using a caustic soda or lye solution, as above-described in connection with darkening step 21. The bitterness of the olives can only be partially cut, or more preferably, the bitterness can be cut to the olive pits and the processed olives thereafter have bitterness enhancers added, as desired, for better control of the bitterness level.

With the flavor bitterness reduced by cutting, the addition of a mother brine to the packing solution for the olives is more effective in imparting the fermentation flavors to the olives. It is possible and highly desirable to add other flavorings with the fermentation mother brine to the packing brine, and the overall flavoring process can be best understood by reference to FIG. 3.

In the preferred form of the process, mother brine and flavorings are all mixed together in blender 61, as indicated by step 61. A high shear blender, such as the Likwifier blender, (widely used in the commercial food processing) can be used to blend these ingredients for about 5 minutes.

After the various flavoring additives are blended in the Likwifier 61, they are placed in mixing tank 63 and water and a saturated salt solution are added, as indicated by step 73. The mixing proceeds for approximately 10–15 minutes so that all the ingredients are thoroughly mixed, including the mother brine and all the other flavor adding ingredients. If the flavoring additives are water soluble, separation of flavoring during storage is not a problem. Non-water soluble and particulate flavorants can also be added, as shown by step 75. If non-water soluble flavorants are employed, it is preferable to add an emulsifier to reduce the likelihood of separation. Particulate flavorants also pose material handling problems. Adding particulates to the packing brine can slow the process down over that which can be achieved when non-particulate flavorants are used. If line speed is not a consideration, particulate spices and herbs, such as oregano leaves and garlic cloves, can also be incorporated in the brine, or added directly to the product.

Table 1 shows the formula for a typical acidic brine packing solution in accordance with the present invention. Mother brine from a fermentation process is present in the amount of about 16 percent by weight. Water is the largest constituent, being present in the amount of about 69 percent by weight. The Salometer of the mother brine is preferably only 30 degrees. A saturated salt solution (25.1 to 26.4% or 95–100 degree Salometer) is added, for example, 10 percent by volume. It is important that the mother brine's Salometer not be over 30 degrees and that saturated salt solution be added, rather than allowing the mother brine Salometer to increase to a level which is too high. (Too much salt will kill the lactic bacteria required for fermentation.) As above-noted, the target Salometer for fermentation of olives is normally below 30 Salometer, making the mother brine solution ideal for forming a flavoring packing brine. Saturated salt solution is added as a flavorant, not a preservatant.

Flavor additives can include numerous particulate additives, as will be illustrated by the Tables 1–5 set forth below. An important feature of the present invention is the provision of an emulsifier, such as polysorbate 80, in the brine solution. The emulsifier keeps the oil soluble flavor additives in suspension so that these additives, such as oregano oleoresin as shown in Table 1, will not separate in the packing solution over time. Water soluble flavorings can be used without the addition of emulsifiers, although they tend not to be as flavorful.

Another significant feature of the flavoring process of the present invention is the addition of a natural bitterness enhancer. This enables a more reproducible and controlled product to be produced by cutting the olives to substantially reduce their bitterness and then adding back bitterness enhancer to bring the level of bitterness back up to a desired level so as to blend with the complex flavors present in the packing brine solution.

Returning to FIG. 3, the packing brine, with a mother brine component, proceeds from mixer 63 to an overbriner 65. The overbriner provides a waterfall of packing brine for the filling of packages, such as pouches, jars or cans 69 containing olives 67. If the olives are burgundy olives, as indicated at 68, they will be placed in the package and then the package moved to a position for filling by overbriner 65. Obviously, other filling apparatus can be used to place packing brine in the packages. If burgundy olives are being packed, then the packing brine will also be an acidic brine so as to fix the burgundy color in the olives.

From overbriner 65, packages 69 will proceed to a seamer 81 at which point a lid will be seamed onto the can or the package will otherwise be sealed. From the seamer the package can go either to a retort 83 or pasteurizer 85. Retort 83 is preferred since it is more effective in killing all possible pathogens which may be present in the olives or packing brine. It is an important feature of the burgundy colored olives of the present invention that they can withstand retorting without leaching out of the colorant. The low pH (below 4.2) and high salt content of the brine, however, makes it possible to simply pasteurize the colored and flavored olives, rather than use a more aggressive retort treatment. After retorting or pasteurizing, individual containers are usually packaged together, for example, in a case forming apparatus 87.

The following Tables 1–5 set forth packing brine ingredients or formulas, all of which include a mother brine from an olive fermentation process in the range of about 1 weight percent to about 20 weight percent, depending upon the desired flavor that is to be achieved. As will be seen from the ingredients in these Tables, the mother brine and basic salt and water solution can be enhanced in various manners to influence the flavor imparted to the olives. In each case, however, the pH of the packing brine solution is below 4, and this acidic characteristic is particularly well suited for the packing of burgundy colored olives in order to fix the colorant in the olive flesh.

The process of the present invention, therefore, produces olives which may be either burgundy colored or flavored but most preferably, both. The color will remain in the olives as a result of the acidic packing brine, and a complex flavor will be imparted to the olives as a result of the use of a mother brine from an olive fermentation process as a component of the packing brine.

TABLE 1

ORIGINAL BURGUNDY OLIVES

| Ingredient | 3750 Liter Weight | Gallons | Weight Percent |
|---|---|---|---|
| Water | 5,370.64 lbs. | 643.96 gal. | 63.22% |
| Mother Brine | 1,6,98.99 lbs. | 193.33 gal. | 20.00% |
| Saturated Salt Solution | 887.13 lbs. | 88.89 gal. | 10.44% |
| Red Wine Vinegar | 509.69 lbs. | 60.68 gal. | 6.00% |
| Natural Olive Oil Flavor | 13.42 lbs. | | 0.16% |
| Natural Bitterness Enhancer | 8.30 lbs. | | 0.10% |
| Polysorbate 80-Emulsifier | 4.15 lbs. | | 0.05% |
| Oregano Oleoresin | 2.49 lbs. | | 0.03% |
| | 8,494.81 lbs. (990.65 gals.) | | 100.00% |

Original Burgundy Olives — Brine Specifications

| Ingredient | 16 oz Weight | Percent | pH | Salt | Density |
|---|---|---|---|---|---|
| Original Brine | 8.1 oz. | 57.48% | 3.15 ± 0.5 | 4.27 ± 10.2% | 8.58 ± 10.05 |
| Burgundy Olives | 6.0 oz. | 42.52% | | 17.8 ± 0.5° | |
| | 14.1 oz. | 100.00% | | | |

Finished Product Specifications (After 24 Hours)

| pH | Salt |
|---|---|
| 4.00 ± 0.20 | 12.0 ± 1.0° |

TABLE 2

PIMENTO BURGUNDY OLIVES

| Ingredient | 3750 Liter Weight | Gallons | Weight Percent |
|---|---|---|---|
| Water | 5,901.20 lbs. | 707.58 gal. | 69.21% |
| Mother Brine (<30° Salometer) | 937.92 lbs. | 106.73 gal. | 11.00% |
| Saturated Salt Solution (25.7% NaCl) | 767.39 lbs. | 76.89 gal. | 9.00% |
| Red Wine Vinegar | 383.69 lbs. | 45.68 gal. | 4.50% |
| Red Bell Pepper Puree | 255.80 lbs. | | 3.00% |
| Sugar, Granulated | 110.84 lbs. | | 1.30% |
| Red Bell Pepper Powder | 34.11 lbs. | | 0.40% |
| Yeast, B-9538 | 34.11 lbs. | | 0.40% |
| Pimento Flavor | 25.58 lbs. | | 0.30% |
| Lactic Acid | 25.58 lbs. | | 0.30% |
| Red Bell Pepper Flavor | 19.61 lbs. | | 0.23% |
| Natural Olive Oil Flavor | 16.20 lbs. | | 0.19% |
| Natural Bitterness Enhancer | 7.67 lbs. | | 0.09% |
| Polysorbate 80 | 6.82 lbs. | | 0.08% |
| | 8,526.51 lbs. (990.65 gals.) | | 100.00% |

Pimento Marinata Olives — Brine Specifications

| Ingredient | 16 oz. Weight | Percent | pH | Salt | Density |
|---|---|---|---|---|---|
| Pimento Brine | 8.1 oz. | 57.48% | 3.03 ± 0.5 | 3.18 ± 0.2 | 8.61 ± 0.05 |
| Burgundy Olives | 6.0 oz. | 42.52% | | 18.6 ± 0.5° | |
| | 14.1 oz. | 100.00% | | | |

Finished Product Specifications (After 24 Hours)

| pH | Salt |
|---|---|
| 3.8 ± 0.20 | 12.0 ± 1.0° |

TABLE 3

CAESAR BURGUNDY OLIVES

| Ingredient | 3750 Liter Weight | Gallons | Weight Percent |
| --- | --- | --- | --- |
| Water | 6,722.68 lbs. | 806.08 gal. | 79.16% |
| Saturated Salt Solution | 1,104.95 lbs. | 110.72 gal. | 13.10% |
| Red Wine Vinegar | 454.02 lbs. | 54.05 gal. | 5.35% |
| Mother Brine | 85.66 lbs. | 9.75 gal. | 1.01% |
| Yeast, B-9538 | 47.93 lbs. | | 0.56% |
| Natural Olive Oil Flavor | 17.96 lbs. | | 0.21% |
| Lactic Acid | 16.98 lbs. | | 0.20% |
| Garlic Concentrate | 16.26 lbs. | | 0.19% |
| Natural Bitterness Enhancer | 8.61 lbs. | | 0.10% |
| Anchovy Paste | 6.79 lbs. | | 0.08% |
| Natural Cheese Flavor | 6.79 lbs. | | 0.08% |
| Polysorbate 80 | 4.25 lbs. | | 0.05% |
| | 8,492.83 lbs. (990.65 gals.) | | 100.00% |

| Caesar Marinata Olives | Brine Specifications | | | | |
| --- | --- | --- | --- | --- | --- |
| Ingredient | 16 oz. Weight | Percent | pH | Salt | Density |
| Caesar Brine | 8.1 oz. | 57.48% | $3.01 \pm 0.05$ | $3.42 \pm 0.2\%$ | $8.57 \pm 0.05$ |
| Burgundy Olives | 6.0 oz. | 42.52% | | $17.0 \pm 0.5°$ | |
| | 14.1 oz. | 100.00% | | | |

| Finished Product Specifications (After 24 Hours) | |
| --- | --- |
| pH | Salt |
| $3.80 \pm 2.0$ | $12.0 \pm 1.0°$ |

TABLE 4

ITALIAN BURGUNDY OLIVES

| Ingredient | 3750 Liter Weight | Gallons | Weight Percent |
| --- | --- | --- | --- |
| Water | 6,161.48 lbs. | 738.79 gal. | 72.44% |
| Mother Brine | 1,001.86 lbs. | 114.00 gal. | 11.78% |
| Saturated Salt Solution | 807.95 lbs. | 80.96 gal. | 9.50% |
| Red Wine Vinegar | 387.81 lbs. | 46.17 gal. | 4.56% |
| Roast Flavor | 64.64 lbs. | | 0.76% |
| Yeast, B-9538 | 47.83 lbs. | | 0.56% |
| Garlic Concentrate | 14.21 lbs. | | 0.17% |
| Natural Olive Oil Flavor | 6.54 lbs. | | 0.08% |
| Natural Bitterness Enhancer | 5.04 lbs. | | 0.06% |
| Polysorbate 80 | 4.92 lbs. | | 0.06% |
| Oregano Oleoresin | 2.57 lbs. | | 0.03% |
| Rosemary Oleoresin | 0.38 lbs. | | 0.004% |
| Basil Oleoresin | 0.28 lbs. | | 0.003% |
| Thyme Oleoresin | 0.20 lbs. | | 0.002% |
| | 8,505.71 lbs. (990.65 gals.) | | 100.00% |

| Italian Marinata Olives | Brine Specifications | | | | |
| --- | --- | --- | --- | --- | --- |
| Ingredient | 16 oz Weight | Percent | pH | Salt | Density |
| Italian Brine | 8.1 oz. | 57.48% | $3.68 \pm 0.05$ | $3.37 \pm 0.20\%$ | $8.59 \pm 0.5$ |
| Burgundy Olives | 6.0 oz. | 42.52% | | $16.2 \pm 0.5°$ | |
| | 14.1 oz. | 100.00% | | | |

TABLE 5

SPICY BURGUNDY OLIVES FORMULA

| Ingredient | 3750 Liter Weight | Gallons | Weight Percent |
|---|---|---|---|
| Water | 5,784.06 lbs. | 693.53 gal. | 67.95% |
| Mother Brine | 1,685.20 lbs. | 191.76 gal. | 19.80% |
| Saturated Salt Solution | 579.11 lbs. | 58.03 gal. | 6.80% |
| Red Wine Vinegar | 281.81 lbs. | 33.55 gal. | 3.31% |
| Yeast Extract | 47.91 lbs. | | 0.56% |
| Yeast, B-9538 | 47.91 lbs. | | 0.56% |
| Tabasco | 25.36 lbs. | | 0.30% |
| Lactic Acid | 20.29 lbs. | | 0.24% |
| Polysorbate 80 | 17.75 lbs. | | 0.21% |
| Green Chili Flavor | 6.76 lbs. | | 0.08% |
| Natural Olive Oil Flavor | 5.07 lbs. | | 0.06% |
| Chipotle Oleoresin | 4.23 lbs. | | 0.05% |
| Southwestern Flavor | 1.69 lbs. | | 0.02% |
| Mexican Blend | 1.69 lbs. | | 0.02% |
| Capsicum Oleoresin | 1.69 lbs. | | 0.02% |
| Cilantro Oleoresin | 1.13 lbs. | | 0.01% |
| | 8,511.65 lbs. (990.65 gals.) | | 100.00% |

| Spicy Marinata Olives | | Brine Specifications | | | |
|---|---|---|---|---|---|
| Ingredient | 16 oz. Weight | Percent | pH | Salt | Density |
| Spicy Brine | 8.1 oz. | 57.48% | 3.55 ± 0.05 | 3.32 ± 02.% | 8.59 ± 0.5 |
| Burgundy Olives | 6.0 oz. | 42.52% | | 16.6 ± 0.5° | |
| | 14.1 oz. | 100.00% | | | |

What is claimed is:

1. A process for producing burgundy colored olives comprising the steps of:
   (a) darkening the color of the olives;
   (b) substantially neutralizing the pH of the olives;
   (c) while neutralized, soaking the olives in an aqueous solution of a food grade Red Dye at ambient temperatures for a period of at least 12 hours; and
   (d) placing the olives in an acidic solution for storage.

2. The process as defined in claim 1 wherein, said darkening step is accomplished using immersing the olives in a caustic solution and exposing the olives to air.

3. The process as defined in claim 2 wherein, said immersing step is accomplished by periodically immersing the olives in a lye solution and followed by immersion in fresh water.

4. The process as defined in claim 3 wherein, said exposing step is accomplished during said immersion in fresh water by bubbling air through the water containing olives.

5. The process as defined in claim 1 wherein, said neutralizing step is accomplished by bringing the pH level of the olives to between about 7.0 to about 8.0.

6. The process as defined in claim 1 wherein, said soaking step is accomplished by soaking the olives in a solution of Red Dye No. 3, and after said soaking step, rinsing excessive Red Dye No. 3 from the olives with an aqueous solution.

7. The process as defined in claim 1 wherein, said placing step is accomplished by packing said olives in an acidic brine solution.

8. The process as defined in claim 7 wherein, said packing step is accomplished by packing said olives in an acidic brine solution including a mother brine used in an olive fermentation process.

9. The process as defined in claim 1, and prior to the darkening step, storing freshly harvested olives in an acetic acid solution with sodium benzoate additive.

10. The process as defined in claim 1, and prior to the darkening step, storing freshly harvested olives at least until olive harvesting is completed in the area of growth of the olives.

11. The process as defined in claim 1 wherein, the acidic solution is an organic acid.

12. A process for producing burgundy colored olives comprising the steps of:
    (a) cutting the bitterness of the olives by soaking them in a caustic solution;
    (b) during the cutting step, exposing the olives to air to darken the color of the olives;
    (c) after the cutting step, neutralizing the olives to bring the pH level of the olives to between about 7.0 to about 8.0;
    (d) while neutralized, soaking the olives in an aqueous solution of Red Dye No. 3 at an ambient temperature for a period of time sufficient to produce a burgundy color in the darkened olives;
    (e) rinsing the olives to remove unfixed Red Dye No. 3; and
    (f) placing the olives in an acidic solution.

13. The process of claim 12 wherein, the soaking step is accomplished by soaking the olives in an aqueous solution of Red Dye No. 3 for between about 14 to about 48 hours at ambient temperatures.

14. The process of claim 13 wherein, the soaking step is accomplished by soaking the olives in an aqueous solution having about 0.1 to about 0.5 percent Red Dye No. 3 with about 100 milliliters of solution per about 100 grams of olives.

15. The process of claim 14 wherein, the aqueous solution has about 0.3 percent Red Dye No. 3.

16. The process as defined in claim 12 wherein,
said cutting step is accomplished by soaking the olives in a lye solution having between about 1.0 and about 2.5 percent lye, followed by draining the lye solution, adding fresh water to the olives and bubbling air through the fresh water to expose the olives to air for darkening.

17. The process as defined in claim 16 wherein,
the soaking step is accomplished for between about 4 to about 8 hours and the step of bubbling air through fresh water is accomplished for about 8 to about 12 hours.

18. The process as defined in claim 17 wherein,
there are at least 3 cycles of soaking the olives in lye followed by draining the lye, adding fresh water and bubbling air through the fresh water.

19. The process as defined in claim 12 wherein,
the neutralizing step is accomplished by immersing the olives in water containing $CO_2$ for between about 1 to about 4 hours and thereafter immersing the olives in fresh water for at least 8 hours.

20. The process as defined in claim 19 wherein,
the neutralizing step is accomplished by immersing the olives in water containing $CO_2$ for about 1 hour to about 4 hours and immersing the olives in fresh water for about 12 hours.

21. The process as defined in claim 12 wherein,
before said placing step, pitting said olives, and during said placing step, packing the olives in a container.

22. The process as defined in claim 21 wherein,
said pitting step is accomplished after said rinsing step.

23. The process as defined in claim 12 wherein,
said placing step is accomplished by packing said olives in a container using an acidic brine solution.

24. The process as defined in claim 23 wherein,
said packing step is accomplished using an acidic brine solution including a mother brine by-product forming an olive fermentation process in an amount of between about 1.0 to about 20 percent by volume.

25. The process as defined in claim 23 wherein,
said acidic brine solution has a pH level below about 4.0.

26. The process as defined in claim 25 wherein,
said acidic brine solution has a pH level between about 2.3 and about 3.3.

27. The process as defined in claim 12 wherein,
the olives are selected from at least one of Manzanilla, Ascalano and Sevillano olives.

28. A process for producing complexly flavored olives comprising the steps of:
processing the olives for packing; and
thereafter packing the olives in a container in a brine solution including a mother brine from an olive fermentation process in the amount of about 1 to about 20 percent by weight.

29. The process as defined in claim 28 wherein,
the processing step includes the step of cutting the bitterness of the olives.

30. The process as defined in claim 28 wherein,
the processing step includes the step of coloring the olives.

31. The process as defined in claim 29 wherein,
the coloring step is accomplished by darkening the olives during the cutting step and thereafter dying the olives using erythrosine dye.

32. The process as defined in claim 31 wherein,
said packing step is accomplished by packing the olives in an acidic brine solution.

33. The process as defined in claim 28 wherein,
the mother brine solution is a byproduct of fermenting one of Kalamata, Spanish and Sicilian olives.

34. The process as defined in claim 28 wherein,
said step of packing the olives in a brine solution containing a mother brine is accomplished by using a mother brine having salt level less than about 30°, as measured by a Salometer, and the step of adding a saturated salt solution to the brine solution in an amount between about 6 to about 20 percent by volume.

35. The process as defined in claim 34 and the step of:
adding flavorants to the brine solution.

36. The process as defined in claim 34 wherein,
the step of adding flavorants includes the step of adding oil-based flavorants and an emulsifying agent to the brine solution in an amount effective to effect suspension of the oil-based flavorants in the brine solution.

37. The process as defined in claim 28 wherein,
during the processing step, the bitterness of the olives is cut to the olive pits, and the step of adding bitterness enhancer to control the bitterness level in the olives.

38. The process as defined in claim 28 wherein,
the packing step is accomplished by packing the olives in a brine solution in which the brine solution is at least equal to the weight percent of the olives.

39. The product made by the process as defined in claim 12.

40. The product made by the process as defined in claim 28.

* * * * *

UNITED STATES PATENT AND TRADEMARK OFFICE
CERTIFICATE OF CORRECTION

| | |
|---|---|
| PATENT NO. | : 6,703,059 B2 |
| APPLICATION NO. | : 10/127016 |
| DATED | : March 9, 2004 |
| INVENTOR(S) | : Abdulkadir Yussuf Sigal et al. |

It is certified that error appears in the above-identified patent and that said Letters Patent is hereby corrected as shown below:

In Col. 9, Table 1, under Original Brine, under Salt, change "4.27 ± 10.2%" to -- 4.27 ± 0.2% --; under Density, change "8.58 ± 10.05" to -- 8.58 ± 0.05 --.

Signed and Sealed this

Twenty-ninth Day of January, 2008

JON W. DUDAS
*Director of the United States Patent and Trademark Office*